(12) United States Patent
Chubb et al.

(10) Patent No.: US 6,593,849 B2
(45) Date of Patent: Jul. 15, 2003

(54) WHEEL LIFT IDENTIFICATION FOR AN AUTOMOTIVE VEHICLE

(75) Inventors: Erik Christopher Chubb, Royal Oak, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/038,364

(22) Filed: Jan. 4, 2002

(65) Prior Publication Data

US 2002/0056582 A1 May 16, 2002

Related U.S. Application Data

(63) Continuation-in-part of application No. 09/669,513, filed on Sep. 25, 2000.

(51) Int. Cl.⁷ ............................................... B60C 23/00
(52) U.S. Cl. ................. 340/446; 340/440; 340/438; 340/441; 340/465; 180/172; 180/197; 701/1; 701/36; 701/41; 701/42; 701/45; 701/46; 701/69; 701/70; 701/71; 701/91
(58) Field of Search ..................... 340/446, 440, 340/438, 441, 465; 180/172, 197; 701/1, 36, 41, 42, 45, 46, 69, 70, 71, 91

(56) References Cited

U.S. PATENT DOCUMENTS

| | | |
|---|---|---|
| 4,650,212 A | 3/1987 | Yoshimura |
| 4,713,585 A | 12/1987 | Kurosawa |
| 4,761,022 A | 8/1988 | Ohashi et al. |
| 4,976,330 A | 12/1990 | Matsumoto |
| 5,265,020 A | 11/1993 | Nakayama |
| 5,370,199 A | 12/1994 | Akuta et al. |
| 5,475,593 A | 12/1995 | Townend |
| 5,742,918 A * | 4/1998 | Ashrafi et al. ................. 701/70 |
| 5,825,284 A * | 10/1998 | Dunwoody et al. ......... 340/440 |
| 6,002,974 A | 12/1999 | Schiffmann |
| 6,002,975 A | 12/1999 | Schiffmann et al. |
| 6,169,946 B1 * | 1/2001 | Griessbach ................... 701/45 |
| 6,192,305 B1 | 2/2001 | Schiffmann |
| 6,290,019 B1 * | 9/2001 | Kolassa et al. ............. 180/282 |
| 6,292,759 B1 * | 9/2001 | Schiffmann ................. 702/151 |
| 6,332,104 B1 * | 12/2001 | Brown et al. ................... 701/1 |
| 6,338,012 B2 * | 1/2002 | Brown et al. ................... 701/1 |

* cited by examiner

Primary Examiner—Daniel J. Wu
Assistant Examiner—Tai T. Nguyen
(74) Attorney, Agent, or Firm—Gregory P. Brown

(57) ABSTRACT

A system and method for detecting wheel lift of an automotive vehicle includes a yaw rate sensor (28) that generates a yaw rate signal, a lateral acceleration sensor (32) that generates a lateral acceleration signal, a roll rate sensor (34) generating a roll rate signal, and a longitudinal acceleration sensor (36) for generating a longitudinal acceleration signal. A controller (18) is coupled to the yaw rate sensor (28), the lateral acceleration sensor (32), the roll rate sensor (34), and the longitudinal acceleration sensor (36). The controller determines a dynamic load transfer acting on the plurality of wheels as a function of yaw rate, lateral acceleration roll rate, and longitudinal acceleration. Normal forces for each of the plurality of wheels is determined as a function of the dynamic load transfer. Wheel lift is indicated when at least one of the normal forces for each of the plurality of wheels is less than a normal force threshold.

19 Claims, 2 Drawing Sheets

WHEEL LIFT IDENTIFICATION FOR AN AUTOMOTIVE VEHICLE

RELATED APPLICATIONS

The present invention is a continuation-in-part of co-pending U.S. application Ser. No. 09/669,513 file on Sep. 25, 2000 entitled "Wheel Lift Identification For An Automotive Vehicle", which is hereby incorporated by reference herein.

TECHNICAL FIELD

The present invention relates generally to a dynamic behavior control apparatus for an automotive vehicle, and more specifically, to a method and apparatus for determining whether a wheel of an automotive vehicle has lifted from the pavement.

BACKGROUND

Dynamic control systems for automotive vehicles have recently begun to be offered on various products. Dynamic control systems typically control the yaw of the vehicle by controlling the braking effort at various wheels of the vehicle. By regulating the amount of braking at each corner of the vehicle, the desired direction of the vehicle may be maintained.

Typically, the dynamic control systems do not address roll of the vehicle. For high profile vehicles in particular, it would be desirable to control the rollover characteristics of the vehicle to maintain the vehicle position with respect to the road. That is, it is desirable to maintain contact of each of the four tires of the vehicle on the road.

Vehicle rollover and tilt control (or body roll) are distinguishable dynamic characteristics. Tilt control maintains the body on a plane or nearly on a plane parallel to the road surface. Rollover control is used to maintain the vehicle wheels on the road surface.

Such systems typically use position sensors to measure the relative distance between the vehicle body and the vehicle suspension. One drawback to such systems is that the distance from the body to the road must be inferred. Another drawback is that additional sensors must be used in addition to the sensors used in a rollover prevention system. This, of course increases the cost of the system.

It would therefore be desirable to provide a rollover detection system having reduced costs and increased reliability in predicting the occurrence of a rollover.

SUMMARY OF THE INVENTION

It is therefore one object of the invention to provide a rollover detection system that may be used in conjunction with the dynamic stability control system of the vehicle to determine rollover.

In one aspect of the invention, a system and method for detecting wheel lift of an automotive vehicle includes a yaw rate sensor that generates a yaw rate signal, a lateral acceleration sensor that generates a lateral acceleration signal, a roll rate sensor generating a roll rate signal, and a longitudinal acceleration sensor for generating a longitudinal acceleration signal. A controller is coupled to the yaw rate sensor, the lateral acceleration sensor, the roll rate sensor, and the longitudinal acceleration sensor. The controller determines a dynamic load transfer acting on the plurality of wheels as a function of yaw rate, lateral acceleration roll rate, and longitudinal acceleration. Normal forces for each of the plurality of wheels is determined as a function of the dynamic load transfer. Wheel lift is indicated when at least one of the normal forces for each of the plurality of wheels is less than a normal force threshold.

In a further aspect of the invention, a method for determining wheel lift of a vehicle comprises the steps of:

measuring a yaw rate;

measuring a lateral acceleration;

measuring a roll rate;

measuring longitudinal acceleration; and determining wheel lift as a function of yaw rate, lateral acceleration, roll rate and longitudinal acceleration.

One advantage of the invention is that in vehicles employing a dynamic stability control system, additional sensors may not be required.

Other advantages and features of the present invention will become apparent when viewed in light of the detailed description of the preferred embodiment when taken in conjunction with the attached drawings and appended claims.

DESCRIPTION OF THE PREFERRED EMBODIMENT

The present invention is described with respect to a wheel lift identification system for an automotive vehicle. Those skilled in the art will recognize that the present invention may be incorporated into a rollover prevention system for an automotive vehicle.

Figure 1:
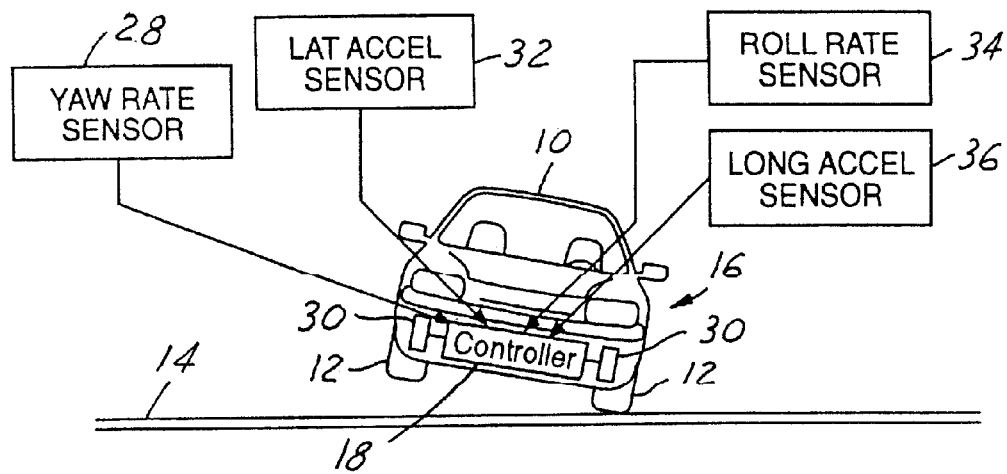
FIG. 1 is a partial cutaway view of an automotive vehicle having a wheel lift identification system according to the present invention.

Referring now to FIG. 1, an automotive vehicle 10 has a plurality of wheels 12, two of which are shown as elevated above a road plane 14. A rollover control system 16 is included within vehicle 10. The rollover control system 16 is used to counteract the lifting of wheels 12 from road plane 14 as will be further described below. Roll control system 16 includes a roll controller 18 that is preferably microprocessor based. Roll controller 18 may be part of a dynamic stability control system of the automotive vehicle 10.

Roll controller 18 is used for receiving information from various sensors that may include a yaw rate sensor 28, a speed sensor 30, a lateral acceleration sensor 32, a roll rate sensor 34, a longitudinal acceleration sensor 36. Lateral acceleration, longitudinal acceleration, yaw rate, roll orientation and speed may be obtained using a global positioning system (GPS). Based upon inputs from the sensors, controller 18 controls a tire force vector to counter rollover of the vehicle by controlling a change in steering angle of the front and/or rear wheels or controlling braking at various corners of the vehicle. Depending on the desired sensitivity of the system and various other factors, not all the sensors 28–36 may be used in a commercial embodiment.

The present invention may also be used as a back-up system or an initial system that is used to actuate a second check for wheel lift. For example, the present invention may actuate a system such as that described in U.S. patent application Ser. No. 09/669,513, the disclosure of which is hereby incorporated by reference.

Roll rate sensor 34 senses the roll condition based on sensing the linear or rotational relative displacement or displacement velocity of one or more of the suspension chassis components which may include a linear height or travel sensor, a rotary height or travel sensor, a wheel speed sensor, a steering wheel position sensor, a steering wheel velocity sensor and a driver heading command input from an electronic component that may include steer by wire using a hand wheel or joy stick. Roll rate sensor 34 may also sense the roll condition of the vehicle based on sensing the height of one or more points on the vehicle relative to the road surface. Sensors that may be used to achieve this include a lidar or radar-based proximity sensor, a laser-based proximity sensor and a sonar-based proximity sensor.

The roll condition may also be sensed by sensing the force or torque associated with the loading condition of one or more suspension or chassis components including a pressure transducer in an active suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 28 through 36, controller 18 determines a roll condition and controls the steering position of the wheels. Controller 18 may also used to control the front right brake, front left brake, rear left brake and right rear brakes. By using brakes in addition to steering control some control benefits may be achieved. That is, controller 18 may be used to apply a brake force distribution to the brake actuators in a manner described in U.S. Pat. No. 6,263,261 which is hereby incorporated by reference.

Speed sensor 30 may be one of a variety of speed sensors known to those skilled in the art. For example, a suitable speed sensor may include a sensor at every wheel that is averaged by controller 18. Preferably, the controller 18 translates the wheel speeds into the speed of the vehicle. Yaw rate, steering angle, wheel speed and possibly a slip angle estimate at each wheel may be translated back to the speed of the vehicle at the center of gravity (V_CG). Various other algorithms are known to those skilled in the art. Speed may also be obtained from a transmission sensor. For example, if speed is determined while speeding up or braking around a corner, the lowest or highest wheel speed may be not used because of its error. Also, a transmission sensor may be used to determine vehicle speed.

Referring now to FIGS. 2A–2F, an automotive vehicle 190 is illustrated having front left corner 40, front right corner 42, rear right corner 44, and rear left corner 46. As will be further described below, each of these corners corresponds to the wheel at each corner of the vehicle. The normal forces for each of the corners of the vehicle will be determined to determine the likelihood of wheel lift.

Figure 2A:
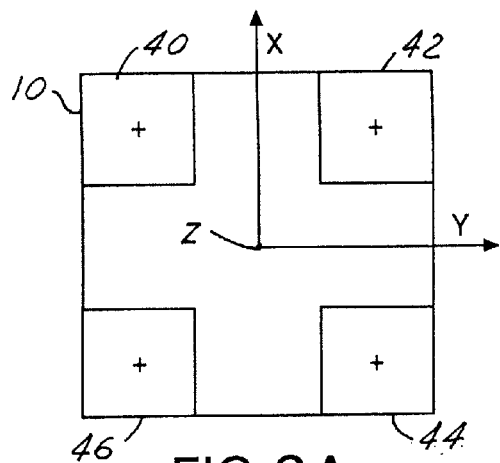
FIGS. 2A through 2F are top views of an automotive vehicle showing normal force transfers on various corners of the vehicle for respective nominal normal forces, pitch acceleration, roll acceleration, longitudinal acceleration, lateral acceleration, and sway bar characteristics.

As shown in FIG. 2A, the x-axis, y-axis and z-axis of the automotive vehicle is illustrated. The positive and negative signs in each corner of automotive vehicle 10 in the figures correspond to the effect of various forces on the normal force distribution. In FIG. 2A, a nominal normal force distribution is determined. Thus, each of the corners of the vehicle are positive. For this force distribution, the sum of the moments around the x-axis is assumed to be zero the sum of the moments around the y-axis is assumed to be zero, and the sum of the vertical forces are assumed to be zero. These three formulas together will be referred to as equation one because by solving them simultaneously the nominal normal forces at each wheel during a static condition may be obtained as shown in the formulas:

$$\Sigma MomentsXX = 0$$

$$\Sigma MomentsYY = 0$$

$$\Sigma Vertical\ Forces = 0 \qquad (Equation\ 1)$$

Thus, the normal forces are essentially the weight of the vehicle divided by the four corners.

Figure 2B:
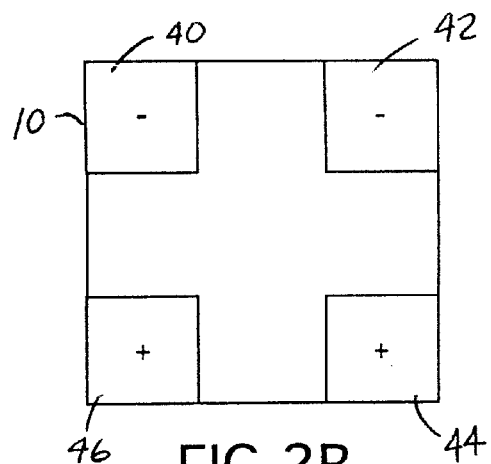

In FIG. 2B, pitch acceleration has a negative effect on the normal force of the front wheels of the vehicle and a positive effect on the rear wheels of the vehicle. The normal force transfer attributable to the pitch acceleration is given by the formula:

$$K_{PITCH} * PitchAcceleration * PitchInertia / (2 * WheelBase) \qquad (Equation\ 2).$$

Pitch acceleration and pitch inertia may be determined by using other sensor signals such as roll, yaw or lateral or longitudinal acceleration. Of course, other methods for determining pitch acceleration are known to those skilled in the art. The $K_{PITCH}$ is a constant that is initially set to a value of one and may be slightly altered to account for various phenomena not considered in the normal force estimate.

Figure 2C:
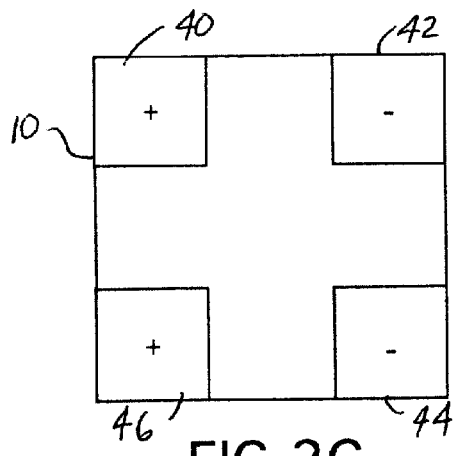

Referring now to FIG. 2C, roll acceleration has a positive effect on the normal force distribution on the left side of the vehicle and a negative effect on the right side of the vehicle. The roll normal force transfer associated with acceleration is determined by the formula:

$$K_{ROLL} * RollAcceleration * RollInertia / (4 * HalfTrack) \qquad (Equation\ 3)$$

where $K_{ROLL}$ is also a constant initially set to a value of one and then altered slightly to account for phenomena not considered in the normal force estimate.

Figure 2D:
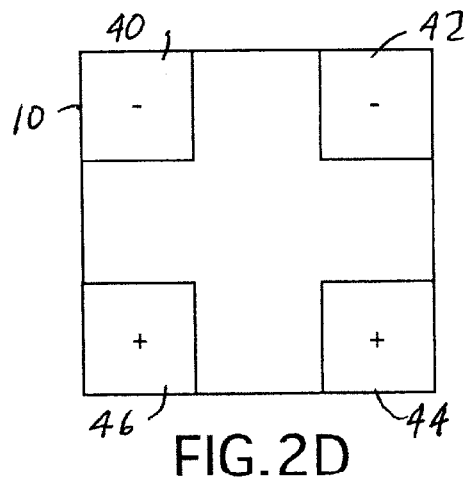

Referring now to FIG. 2D, the longitudinal acceleration has a negative effect on the normal force transfer on the front wheels of the vehicle and a positive effect on the rear wheels of the vehicle. The normal force transfer attributable to the longitudinal acceleration is given by the formula:

$$LongAcceleration * SprungMass * CGHeight / (2 * WheelBase) \qquad (Equation\ 4).$$

Figure 2E:
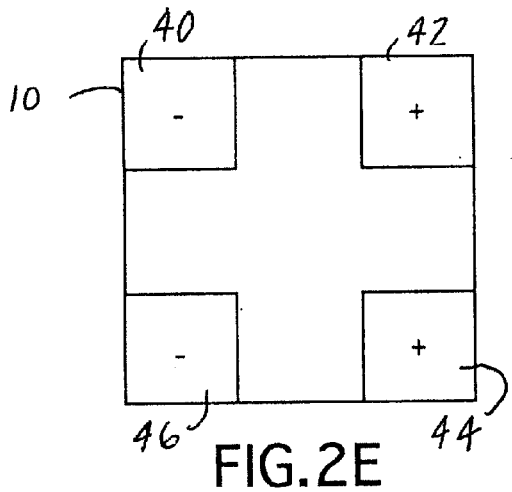

Referring now to FIG. 2E, the normal force transfer attributable to lateral acceleration has a negative effect on the left corners of the vehicle and a positive effect on the right corners of the vehicle. The normal force attributable to lateral acceleration is given by the formula:

$$K_{LAT\ ACC} * LateralAcceleration * SprungMass / (4 * HalfTrack) * "CG\ Height\ Corrected\ for\ Roll\ Angle" \qquad (Equation\ 5)$$

where $K_{LAT\ ACC}$ is a constant initially set to a value of one which may be altered to account for phenomena not considered in a normal force estimate. The "CG Height Corrected for Roll Angle" is the height of the vehicle center of gravity adjusted for the roll angle assuming that any roll motion is centered about the outside tire-contact-patch.

Figure 2F:
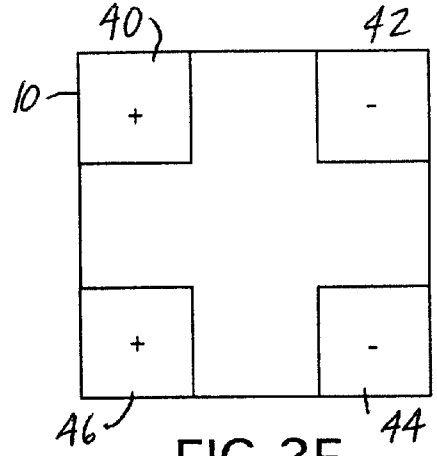

Referring now to FIG. 2F, the normal force transfer due to the sway bars in the vehicle has a negative effect on the front left corner 40 and the right rear corner 44 of the vehicle. A positive effect of the sway bar on the normal force transfer is positive in the front right and left rear of the vehicle. The normal force transfer attributable to the sway bar is given by the formula:

$$K_{SWAY\ BAR} * \text{"Total Lateral Load Transfer"} \qquad \text{(Equation 6)}.$$

$K_{SWAY\ BAR}$ should take into account sway bar stiffness, front-aft differences in the suspension stiffnesses, and the front-aft weight distribution of the vehicle. One example of a suitable formula for determining $K\_{SWAY\ BAR}$ given by the formula:

$$K_{SWAY\ BAR} = 9e-5*(\text{Front Roll Stiffness}(Nm/deg) - \text{Rear Roll Stiffness }(Nm/deg)) \qquad \text{(Equation 6)}$$

where the total lateral load transfer is the sum of the load transfer due to the roll acceleration and lateral acceleration.

Figure 3:
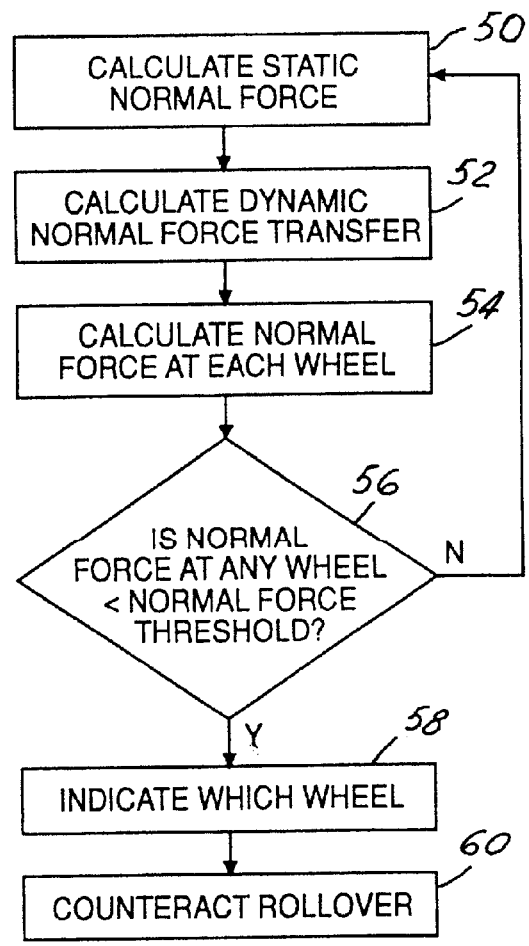
FIG. 3 is a flow chart of a wheel lift identification system according to the present invention.

Referring now to FIG. 3, the method for determining the wheel lift determines the normal force estimates at each of the corners of the vehicle. To initiate the process, the static normal force at each of the corners of the vehicle are determined in step 50. Preferably, this calculation takes place when the vehicle is at rest.

The dynamic normal force transfer are calculated in Equations 2–6 above. In step 54, the normal force (FN) at each wheel as a function of the dynamic normal force transfer in the static normal forces above is determined. The normal forces for each of the wheels are given by the formulas:

$$FN\ of\ Front\ Left = (Eqn\ 1 - Eqn\ 2 + Eqn\ 3 - Eqn\ 4 - Eqn\ 5 - Eqn\ 6)$$

$$FN\ of\ Front\ Right = (Eqn\ 1 - Eqn\ 2 - Eqn\ 3 - Eqn\ 4 + Eqn\ 5 + Eqn\ 6)$$

$$FN\ of\ Rear\ Right = (Eqn\ 1 + Eqn\ 2 - Eqn\ 3 + Eqn\ 4 + Eqn\ 5 - Eqn\ 6)$$

$$FN\ of\ Rear\ Left = (Eqn\ 1 + Eqn\ 2 + Eqn\ 3 + Eqn\ 4 - Eqn\ 5 + Eqn\ 6)$$

In a perfect world if the normal force of any of the corners of the vehicle drops to zero, it can be inferred that the wheel has lifted. If a wheel has lifted, a roll over of the vehicle may be impending and corrective measures may be implemented. By inferring the normal the normal forces at each of the wheels by the use of various sensors that do not directly measure normal forces, some error may be present in the calculation. Therefore, a normal force threshold may be set. For example, a normal threshold of plus or minus 1000N may be used. One thousand N will account for any errors due mainly to varying load conditions in vertical acceleration.

In step 56, the normal force at each wheel is compared to the normal force threshold. If the normal force threshold at any wheel is not less than the normal force threshold then step 50 is again executed. If the normal force threshold is less than the threshold then step 58 is executed in which the normal forces that are below the threshold are indicated in step 58.

In step 60, a counter action of roll over may be performed. As mentioned above either steering, braking or a combination of the two may be used to compensate for the detection of wheel lift at the corners of the vehicle.

While particular embodiments of the invention have been shown and described, numerous variations alternate embodiments will occur to those skilled in the art. Accordingly, it is intended that the invention be limited only in terms of the appended claims.

What is claimed is:

1. A method as for controlling an automotive vehicle having a plurality of wheels comprising:

measuring a yaw rate;

measuring a lateral acceleration;

measuring a roll rate;

measuring longitudinal acceleration;

determining a pitch acceleration; and determining wheel lift as a function of yaw rate, lateral acceleration, roll rate, longitudinal acceleration and pitch acceleration.

2. A method for controlling an automotive vehicle having a plurality of wheels comprising:

measuring a yaw rate;

measuring a lateral acceleration;

measuring a roll rate;

measuring longitudinal acceleration;

determining a normal force attributable to a sway bar; and determining when a wheel has lifted as a function of yaw rate, lateral acceleration, roll rate longitudinal acceleration the normal force attributable to a sway bar.

3. A method as recited in claim 2 further comprising the step of counteracting wheel lift.

4. A method as recited in claim 2 further comprising the step of counteracting wheel lift.

5. A method for determining wheel lift of a wheel of an automotive vehicle comprising:

measuring a lateral acceleration;

measuring a yaw rate;

measuring a roil rate;

measuring longitudinal acceleration;

estimating a normal force acting on the wheel as a function of yaw rate, lateral acceleration, roll rate and longitudinal acceleration;

comparing the normal force to a normal force threshold; and indicating when a wheel has lifted when the normal force on the wheel is less than the normal force threshold.

6. A method as recited in claim 5 further comprising determining a pitch acceleration and, wherein determining the normal force as a function of yaw rate, lateral acceleration, roll rate, longitudinal acceleration and pitch acceleration.

7. A method as recited in claim 5 further comprising determining a normal force attributable to a sway bar, wherein determining the normal force comprises determining the normal force as a function of yaw rate, lateral acceleration, roll rate longitudinal acceleration the normal force attributable to a sway bar.

8. A method as recited in claim 5 determining normal forces for wheels as a function of a static normal force and a dynamic load transfer.

9. A method as recited in claim 5 further comprising the step of counteracting wheel lift.

10. A method for monitoring a condition of an automotive vehicle having a plurality of wheels comprising:

determining a static normal force acting on said plurality of wheels;

determining a dynamic load transfer acting on said plurality of wheels;

determining normal forces for each of said plurality of wheels in as a function of the static normal force and the dynamic load transfer; and indicating when at least one of the wheels has lifted when at least one of the normal forces for each of said plurality of wheels is less than the normal force threshold.

11. A method as recited in claim 10 wherein the normal forces are a function pitch angle.

12. A method as recited in claim 10, wherein the normal forces are a function of road bank angle.

13. A method as recited in claim 10 wherein determining a dynamic load transfer acting on said plurality of wheels comprises measuring a yaw rate;

measuring a lateral acceleration;

measuring a roll rate;

measuring longitudinal acceleration; and determining a dynamic load transfer acting on said plurality of wheels as a function of yaw rate, lateral acceleration, roll rate and longitudinal acceleration.

14. A method as recited in claim 13 further comprising determining a pitch acceleration and, wherein a dynamic load transfer comprises determining a dynamic load transfer as a function of yaw rate, lateral acceleration, roll rate, longitudinal acceleration and pitch acceleration.

15. A method as recited in claim 13 further comprising determining a normal tome attributable to a sway bar, wherein determining a dynamic load transfer comprises determining a dynamic load transfer as a function of yaw rate, lateral acceleration, roll rate longitudinal acceleration the normal force attributable to a sway bar.

16. A method as recited in claim 10 further comprising the step of counteracting wheel lift.

17. A system for detecting lift of a wheel of an automotive vehicle comprising:

a yaw rate sensor generating a yaw rate signal;

a lateral acceleration sensor generating a lateral acceleration signal;

a roll rate sensor generating a roll rate signal;

a longitudinal acceleration sensor generating a longitudinal acceleration signal; and a controller coupled to said yaw rate sensor, said lateral acceleration sensor, said roll rate sensor and said longitudinal acceleration sensor, said controller determining a dynamic load transfer acting on said plurality of wheels as a function of yaw rate, lateral acceleration, roll rate and longitudinal acceleration, determining normal forces for each of said plurality of wheels as a function of the dynamic load transfer, and indicating when a wheel has lifted when at least one of the normal forces for each of said plurality of wheels is less than a normal force threshold.

18. A system as recited in claim 17 wherein said controller determines a pitch acceleration and, determines a dynamic load transfer as a function of yaw rate, lateral acceleration, roll rate, longitudinal acceleration and pitch acceleration.

19. A system as recited in claim 17 wherein said controller determines a normal force attributable to a sway bar and determines a dynamic load transfer as a function of yaw rate, lateral acceleration, roll rate longitudinal acceleration the normal force all attributable to a sway bar.

* * * * *

UNITED STATES PATENT AND TRADEMARK OFFICE
CERTIFICATE OF CORRECTION

PATENT NO. : 6,593,849 B2
DATED : July 15, 2003
INVENTOR(S) : Erik Christopher Chubb and Todd Allen Brown It is certified that error appears in the above-identified patent and that said Letters Patent is hereby corrected as shown below:

Column 6,
Lines 28-42, claim 5 should read as follows:
-- A method for determining wheel lift of a wheel of an automotive vehicle comprising:
measuring a lateral acceleration;
measuring a yaw rate;
measuring a roll rate;
measuring longitudinal acceleration;
estimating a normal force acting on the wheel as a function of yaw rate, lateral acceleration, roll rate and longitudinal acceleration;
comparing the normal force to a normal force threshold; and
indicating when a wheel has lifted when the normal force on the wheel is less than the normal force threshold. --

Column 7,
Lines 48-53, claim 15 should read as follows:
-- A method as recited in claim 13 further comprising determining a normal force attributable to a sway bar, wherein determining a dynamic load transfer comprises determining a dynamic load transfer as a function of yaw rate, lateral acceleration, roll rate longitudinal acceleration the normal force attributable to a sway bar. --

Signed and Sealed this

Twenty-eighth Day of October, 2003

JAMES E. ROGAN
*Director of the United States Patent and Trademark Office*